(12) United States Patent
Takahashi et al.

(10) Patent No.: US 8,719,674 B2
(45) Date of Patent: May 6, 2014

(54) COMMUNICATION APPARATUS

(75) Inventors: Koji Takahashi, Tokyo (JP); Seiji Kozaki, Tokyo (JP); Hideaki Yamanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1661 days.

(21) Appl. No.: 11/817,907

(22) PCT Filed: Jun. 26, 2006

(86) PCT No.: PCT/JP2006/312742
§ 371 (c)(1),
(2), (4) Date: Sep. 6, 2007

(87) PCT Pub. No.: WO2008/001419
PCT Pub. Date: Jan. 3, 2008

(65) Prior Publication Data
US 2009/0254793 A1  Oct. 8, 2009

(51) Int. Cl.
*H03M 13/00* (2006.01)
(52) U.S. Cl.
USPC .......................................... 714/775; 714/798
(58) Field of Classification Search
USPC ................................................ 714/775, 798
See application file for complete search history.

(56) References Cited

U.S. PATENT DOCUMENTS

| | | | |
|---|---|---|---|
| 6,452,991 B1 | 9/2002 | Zak | |
| 7,050,373 B2 * | 5/2006 | Tonami et al. | 369/47.48 |
| 7,152,199 B2 * | 12/2006 | Nuyen et al. | 714/776 |
| 7,343,540 B2 * | 3/2008 | Khermosh et al. | 714/758 |
| 7,581,155 B2 * | 8/2009 | Lee et al. | 714/779 |
| 7,586,820 B2 * | 9/2009 | Oki | 369/47.28 |
| 7,600,171 B2 * | 10/2009 | Lee et al. | 714/751 |
| 7,890,840 B2 * | 2/2011 | Khermosh et al. | 714/777 |
| 7,917,833 B2 * | 3/2011 | Mizuochi et al. | 714/776 |
| 2005/0135803 A1 | 6/2005 | Lee et al. | |
| 2007/0104225 A1 * | 5/2007 | Mizuochi et al. | 370/476 |
| 2008/0260378 A1 | 10/2008 | Khermosh | |

FOREIGN PATENT DOCUMENTS

| | | |
|---|---|---|
| EP | 0 626 771 A2 | 11/1994 |
| JP | 10-117190 | 5/1998 |
| JP | 11-112489 | 4/1999 |
| JP | 11-298467 | 10/1999 |
| JP | 2001-197053 | 7/2001 |

(Continued)

OTHER PUBLICATIONS

IEEE Standard 802.3ah, 2004.*

(Continued)

*Primary Examiner* — Joseph D Torres
(74) *Attorney, Agent, or Firm* — Oblon, Spivak, McClelland, Maier & Neustadt, L.L.P.

(57) ABSTRACT

A communication apparatus realizes an FEC function. In the communication apparatus, a T_FEC-pattern comparing unit calculates a code distance between a pattern of an input FEC frame falling in a certain detection window and the predefined T_FEC pattern for each of the detection windows one after another. Moreover, a code-distance comparing unit compares the code distances with each other to detect a code for boundary identification T_FEC between an IEEE802.3 frame and a FEC parity. Finally, a boundary-signal generating unit generates, based on the detected code for boundary identification T_FEC, a T_FEC boundary signal that indicates a detection position of the T_FEC in the input FEC frame.

6 Claims, 13 Drawing Sheets

(56) References Cited

FOREIGN PATENT DOCUMENTS

| | | |
|---|---|---|
| JP | 2004 523955 | 8/2004 |
| JP | 2005 524281 | 8/2005 |
| KR | 10-2005-0061140 | 6/2005 |
| KR | 10/2005-0092696 | 9/2005 |

OTHER PUBLICATIONS

Ariel Maislos, et al., "FEC in EPON Technical Proposal", IEEE 802.3ah, XP002616684, URL:http://www.ieee802.org/3/efm/baseline/khermosh_general_1_0702.pdf, Jan. 18, 2003, 21 pages.

Lior Khermosh, et al., "Frame FEC in EPON Technical Proposal", XP002616683, URL:http://www.ieee802.org/3/efm/baseline/khermosh_fec_1_0902.pdf, Jan. 18, 2003, 11 pages.

Supplementary Search Report issued Jan. 28, 2011, in European Patent Application No. 06767359.0-1237 / 2034657.

Part 3: Carrier Sense Multiple Access with Collision Detection (CSMA/CD) Access Method and Physical Layer Specifications, IEEE Std 802.3R Evam/2.0-Section 5 Clause 65.2.3, pp. 1 and 311-324, 2004.

\* cited by examiner

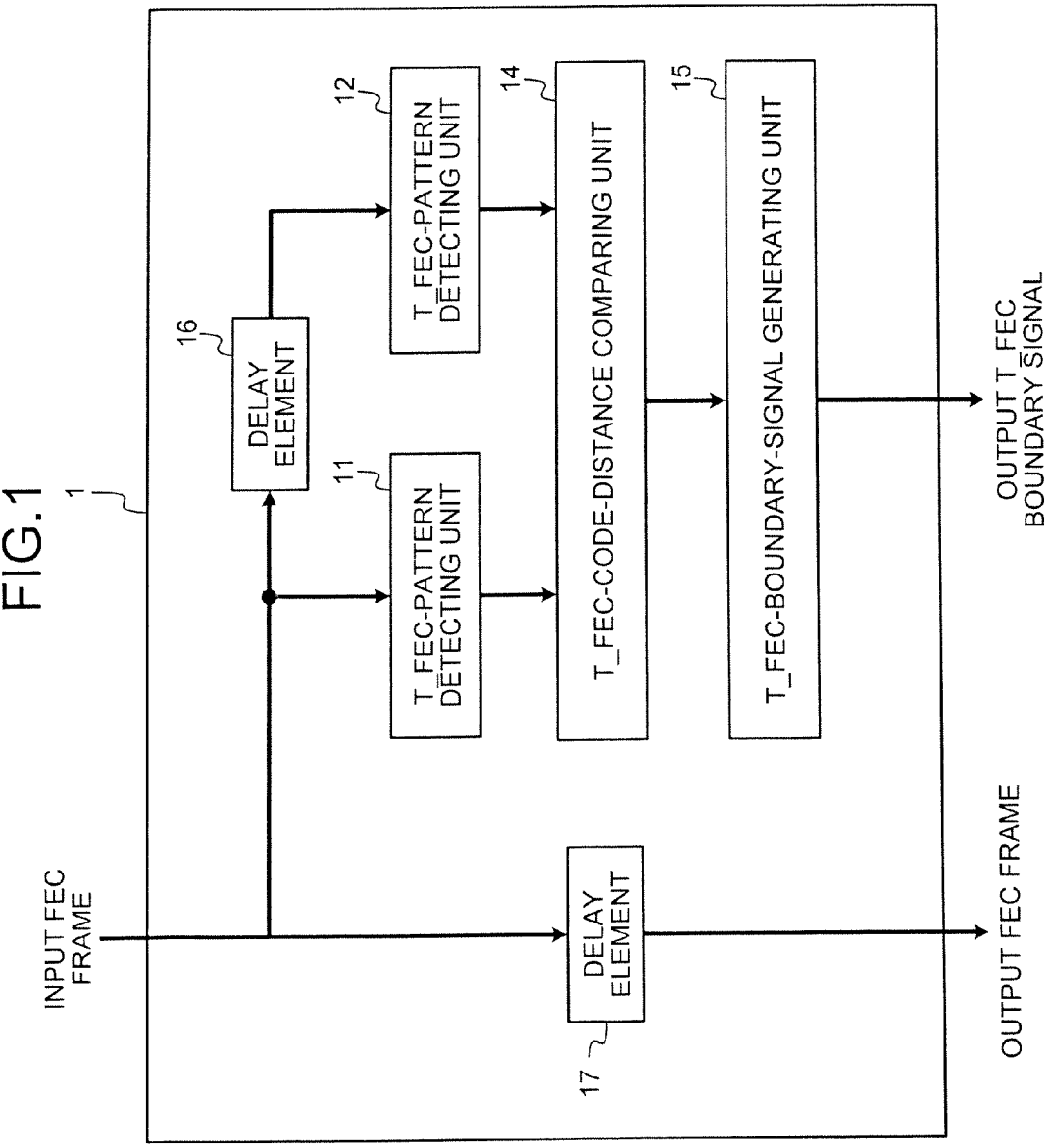

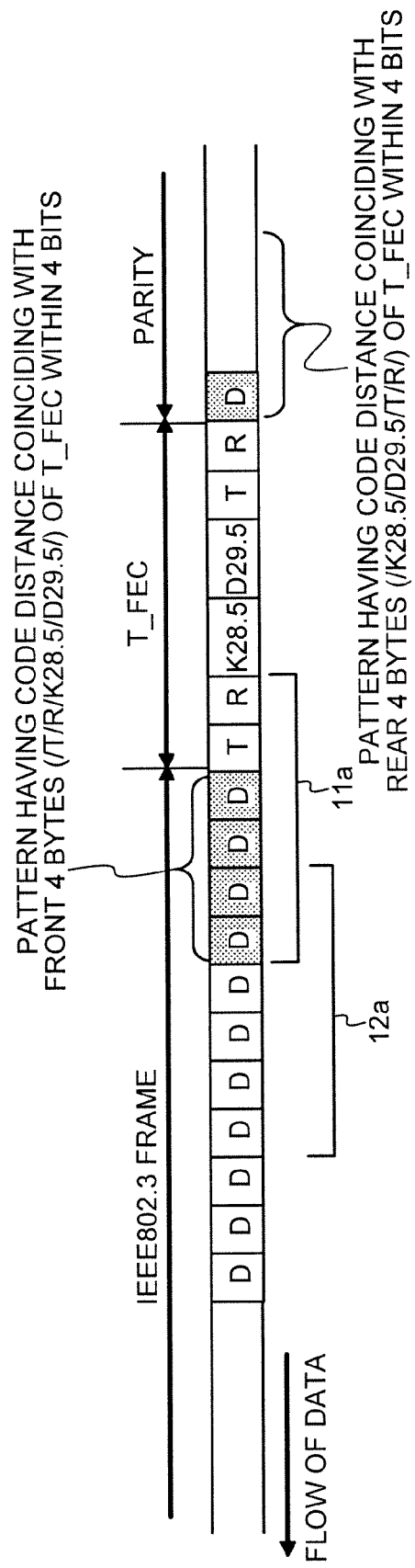

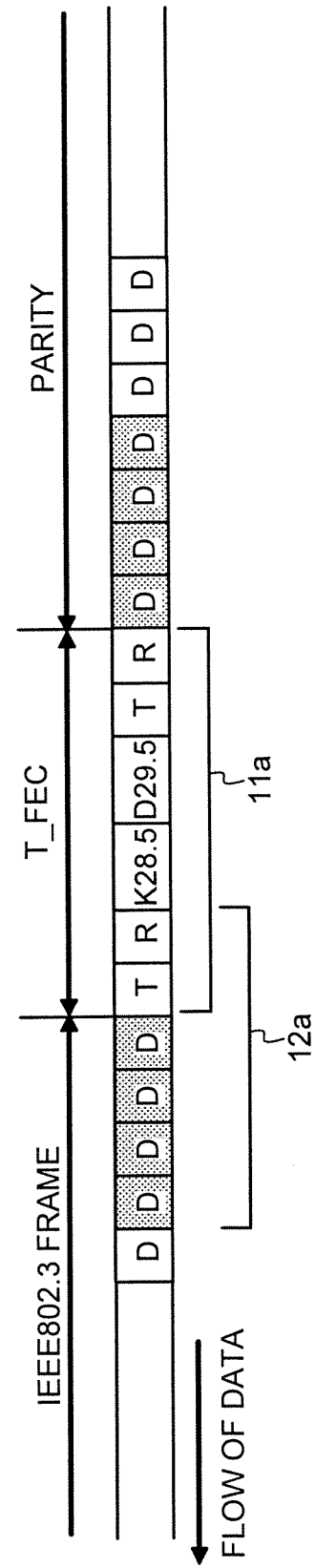

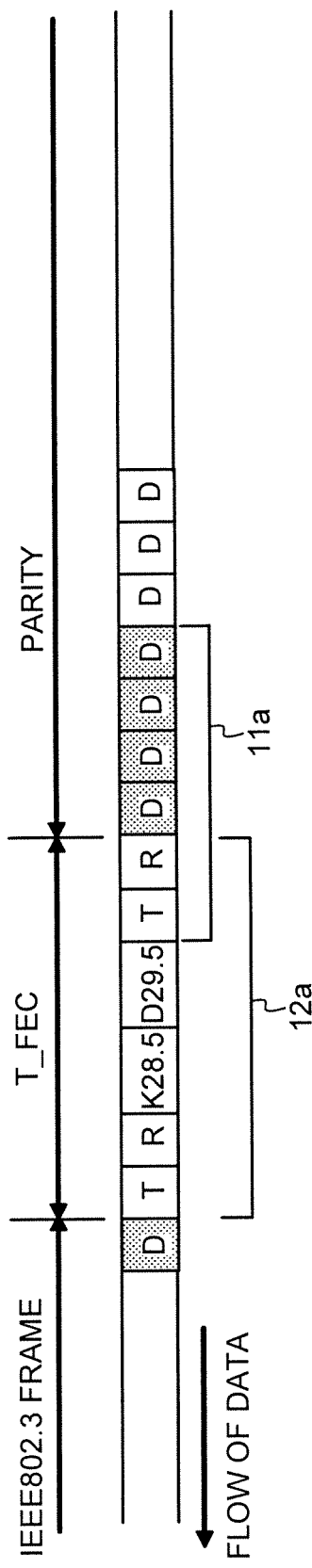

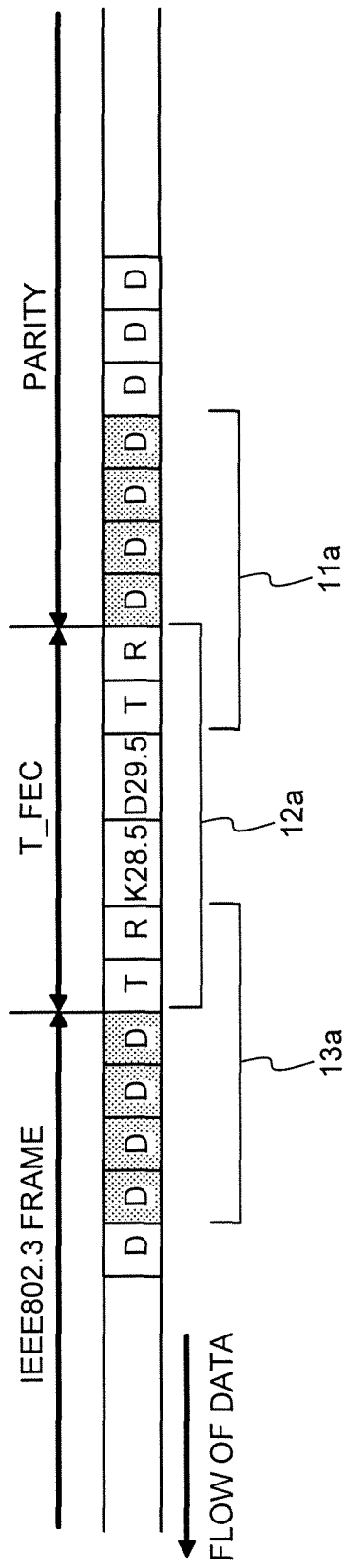

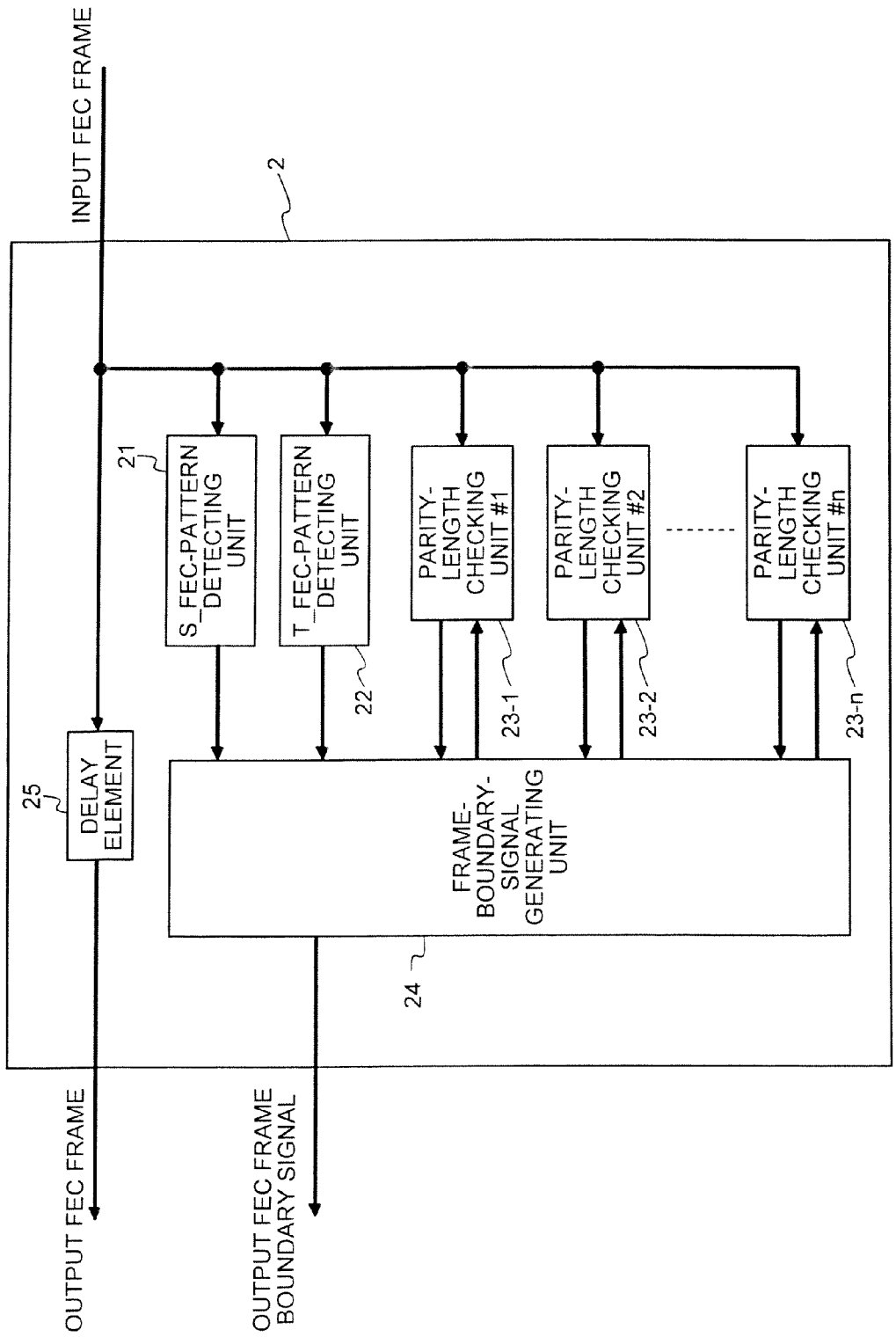

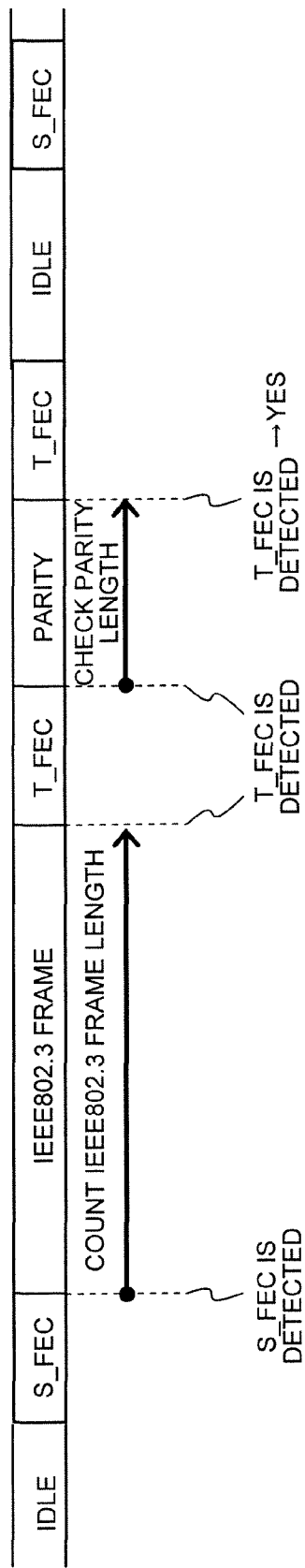

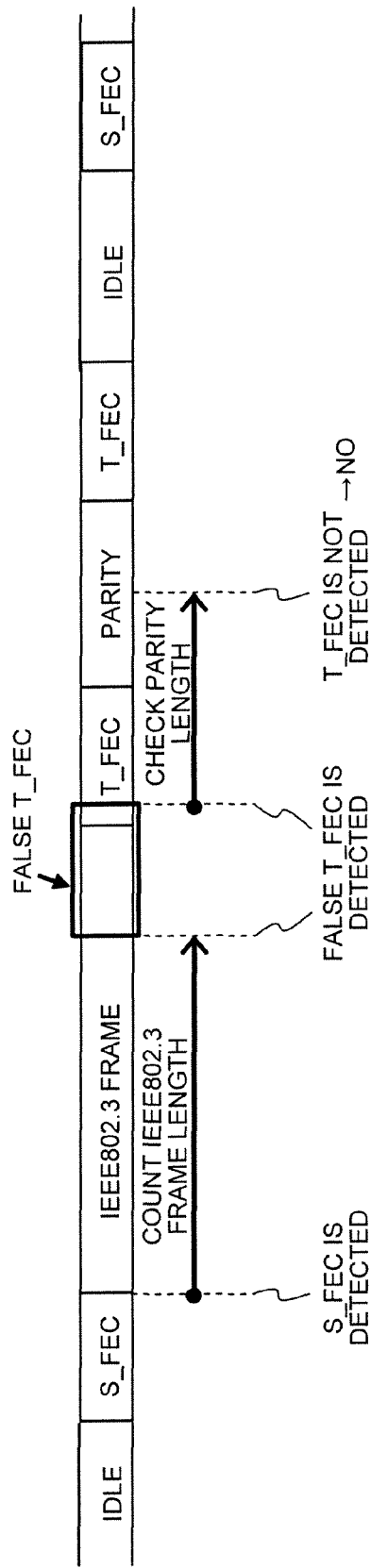

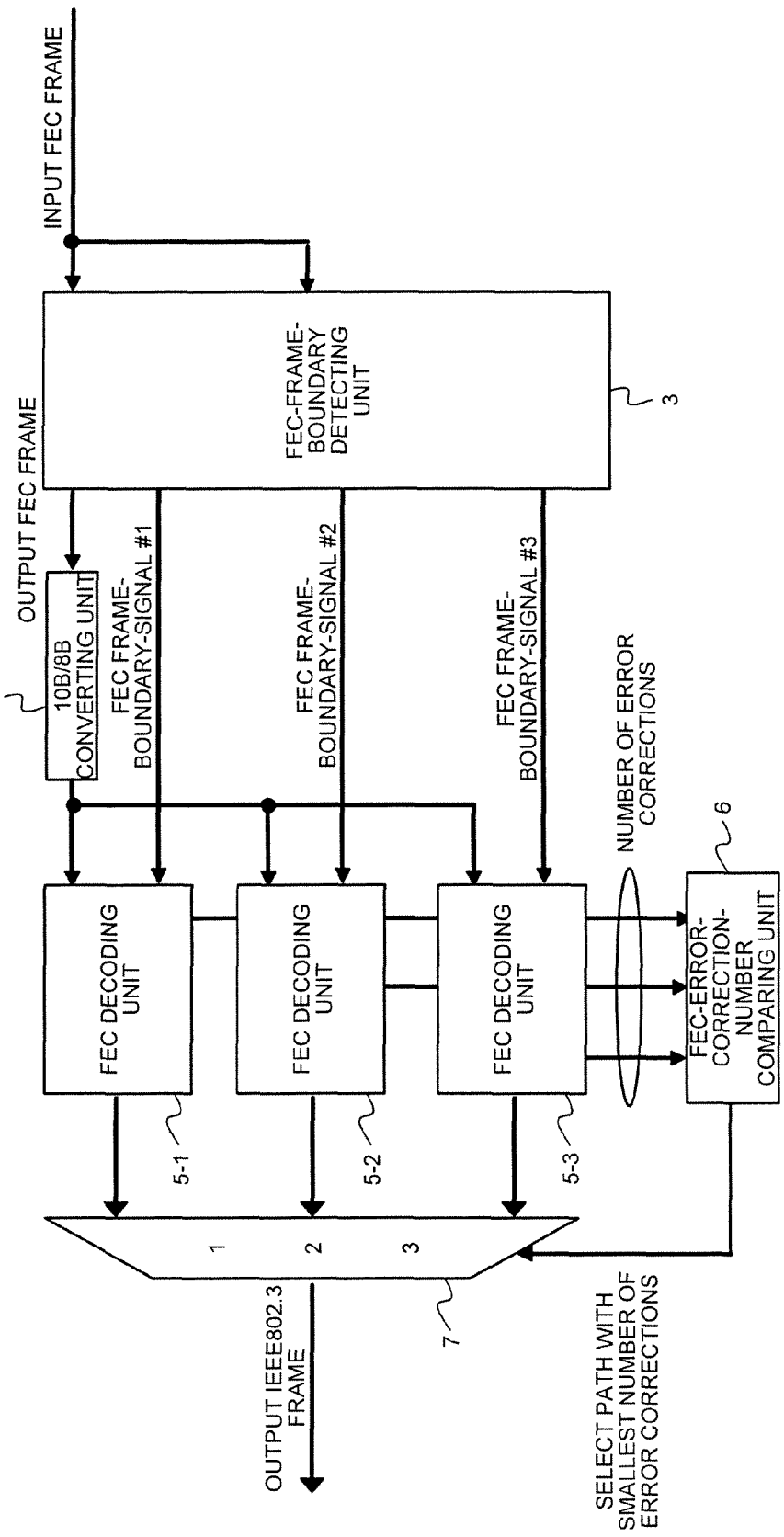

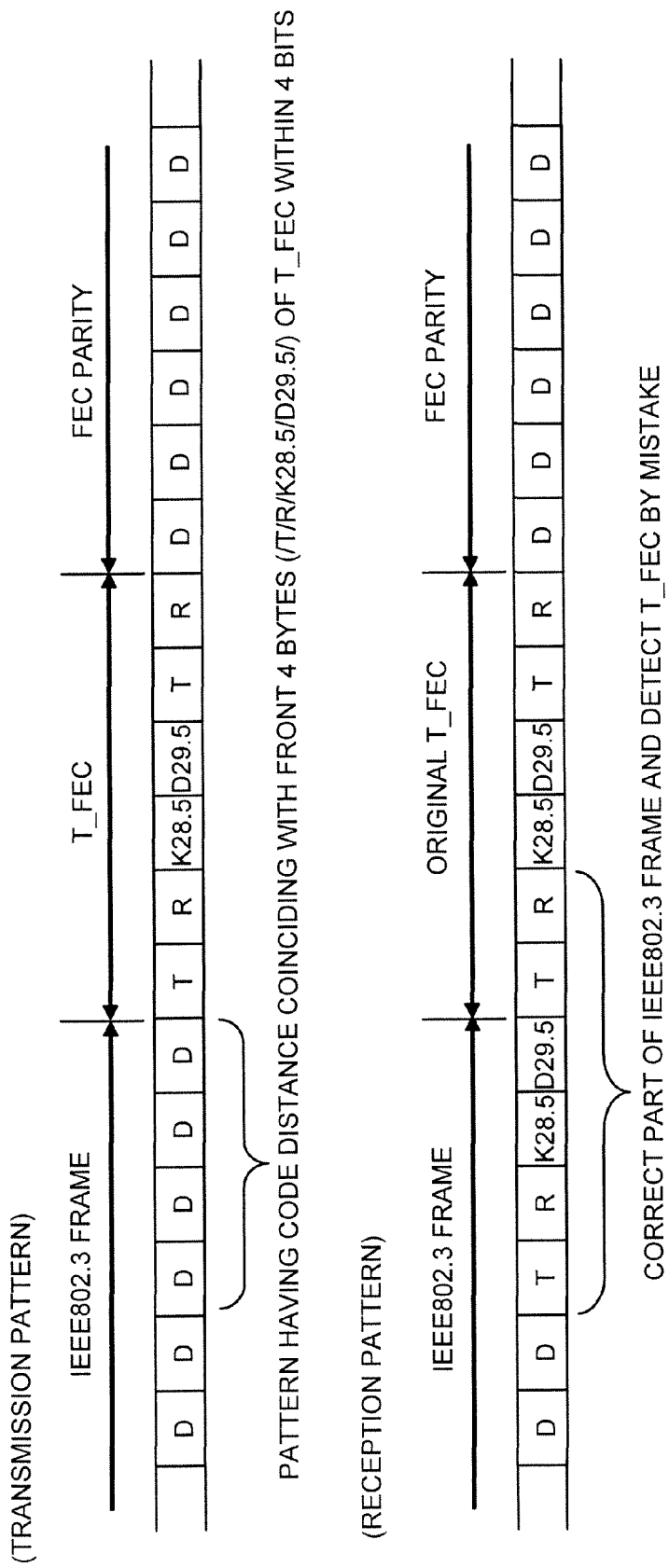

COMMUNICATION APPARATUS

TECHNICAL FIELD

The present invention relates to a communication apparatus adaptable in an optical network of GE-PON (Gigabit Ethernet (registered trademark) Passive Optical Network) system. The present invention relates more particularly to a communication apparatus that can prevent frame mis-synchronization that occurs at a certain frequency when an FEC (forward error correction) function according to the IEEE802.3ah standard is realized.

BACKGROUND ART

The FEC system defined in the conventional GE-PON system (IEEE802.3ah (see Non-Patent Document 1)), as shown in FIGS. 8-1 and 8-2, newly defines an S_FEC and a T_FEC. The S_FEC is a code for identification of a frame start. The T_FEC is a code for identification of a boundary between an IEEE802.3 frame (hereinafter, "frame") and an FEC parity (hereinafter, "parity") and for identification of a parity end. The S_FEC (/K28.5/D6.4/K28.5/D6.4/K27.7/: Dxx.x indicates a 10-bit data code in the 8B/10B code system) is obtained by extending /S/ (/K27.7/: Kxx.x indicates a 10-bit special code in the 8B/10B code system), which is a frame start identification code in the case of a non-FEC frame. The T_FEC (/T/R/K28.5/D29.5(or /D10.1/)/T/R/ or /T/R/R/K28.5/D16.2(or /D5.6/)/T/R/) is obtained by extending an EPD (/T/R or /T/R/R:/T/ indicates /K29.7/ and /R/ indicates /K23.7/), which is a frame end identification code in the case of the non-FEC frame.

These code patterns for frame boundary identification (S_FEC and T_FEC) are added in front of and behind a frame and a parity during frame transmission and outputted to a communication partner apparatus. The receiving unit of the communication partner apparatus establishes frame synchronization (detection of a boundary between the frame and the parity) by detecting these code patterns for frame boundary identification. In IEEE802.3ah, a certain degree of error (in IEEE802.3ah, smaller than 5 bits) is allowed for these code patterns for the frame boundary identification during frame reception to protect code patterns for frame boundary identification not protected by the FEC function and prevent frame synchronization from being overlooked even when a frame propagates on a transmission channel with a high error rate.

Non-Patent Document 1: IEEE802.3ah, section 65.2.3

DISCLOSURE OF INVENTION

Problem to be Solved by the Invention

However, in the conventional FEC system of IEEE802.3ah, as explained above, because a certain degree of error is allowed for the code patterns for frame boundary identification in the receiving unit, even when a transmission channel is error free, as shown in FIG. 9, when last 4 bytes of a frame coincides with front 4 bytes of a T_FEC within an allowable number of errors (i.e., within 4 bits), the T_FEC is detected by mistake.

In FIG. 9, a process of occurrence of misdetection is shown with a T_FEC of 6 bytes (/T/R/K28.5/D29.5(or /D10.1)/T/R/) as an example. Misdetection of T_FEC also occurs when a T_FEC is a code of 7 bytes (/T/R/R/K28.5/D16.2(or /D5.6/)/T/R/).

The present invention has been devised in view of the above. It is an object of the present invention to provide a communication apparatus that can reduce the probability of occurrence of misdetection of a T_FEC, which is located between a frame and a parity, without changing the allowable number of errors of a code pattern for frame boundary identification.

Means for Solving Problem

To solve the above-explaining problems, and to achieve the object, a communication apparatus realizes an FEC function and includes a T_FEC-pattern comparing unit that executes, for each of a plurality of detection windows provided at staggered times, processing for comparing an FEC frame defined in IEEE802.3ah as a reception frame and a T_FEC pattern as a pattern for boundary identification added during transmission and calculates code distances between patterns in the detection windows and the T_FEC pattern one after another; a code-distance comparing unit that compares the code distances calculated for each of the detection windows and detects, based on a result of the comparison, a code for boundary identification T_FEC between an IEEE802.3 frame and an FEC parity; and a boundary-signal generating unit that generates, based on a result of the detection, a T_FEC boundary signal as a signal indicating a detection position (a boundary) of the T_FEC in the FEC frame.

Effect of The Invention

According to the present invention, there is an effect that it is possible to obtain a communication apparatus that can reduce the probability of occurrence of misdetection of the T_FEC compared with the same in the past.

BRIEF DESCRIPTION OF DRAWINGS

FIG. 1 is a diagram of a structure of a T_FEC-between-frame-and-parity detecting unit according to a first embodiment of a communication apparatus according to the present invention.

FIG. 2-1 is a diagram for explaining a T_FEC-between-frame-and-parity detecting method according to the first embodiment.

FIG. 2-2 is a diagram for explaining the T_FEC-between-frame-and-parity detecting method according to the first embodiment.

FIG. 2-3 is a diagram for explaining the T_FEC-between-frame-and-parity detecting method according to the first embodiment.

FIG. 3 is a diagram of a structure of a T_FEC-between-frame-and-parity detecting unit according to a second embodiment of the communication apparatus according to the present invention.

FIG. 4 is a diagram for explaining a T_FEC-between-frame-and-parity detecting method according to the second embodiment.

FIG. 5 is a diagram of a structure of a frame-boundary detecting unit according to a third embodiment of the communication apparatus according to the present invention.

FIG. 6-1 is a diagram for explaining a T_FEC-between-frame-and-parity detecting method according to the third embodiment.

FIG. 6-2 is a diagram for explaining the T_FEC-between-frame-and-parity detecting method according to the third embodiment.

FIG. 7 is a diagram of a structure of a fourth embodiment of the communication apparatus according to the present invention.

FIG. 8-1 is a diagram of the conventional frame format.
FIG. 8-2 is a diagram of the conventional data format.
FIG. 9 is a diagram for explaining a problem of the conventional technology.

EXPLANATIONS OF LETTERS OR NUMERALS

Figure 3:
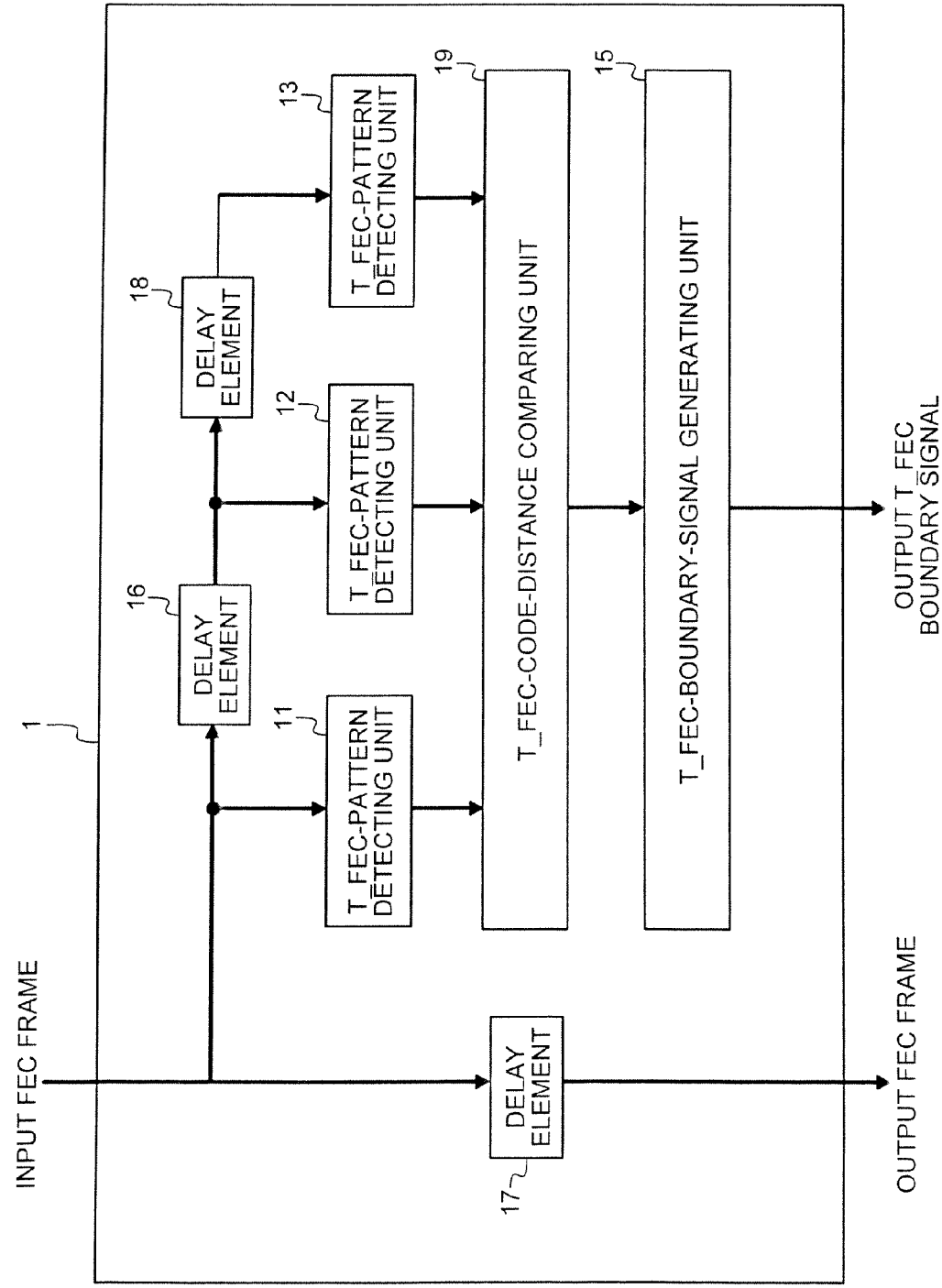

1 T_FEC-between-frame-and-parity detecting unit
3 FEC-frame-boundary detecting unit
4 10B/8B converting unit
5-1, 5-2, 5-3 FEC decoding units
6 FEC-error-correction-number comparing unit
7 Selector
11, 12, 13 T_FEC-pattern detecting units
14, 19 T_FEC-code-distance comparing units
15 T_FEC-boundary-signal generating unit
16, 17, 18 Delay elements
21 S_FEC-pattern detecting unit
22 T_FEC-pattern detecting unit
23-1, . . . , 23-n Parity-length checking units
24 Frame-boundary-signal generating unit
25 Delay element

BEST MODE(S) FOR CARRYING OUT THE INVENTION

Exemplary embodiments of a communication apparatus according to the present invention are explained in detail below based on the drawings. The present invention is not limited by the embodiments.

First Embodiment.

Figures 1, 8:
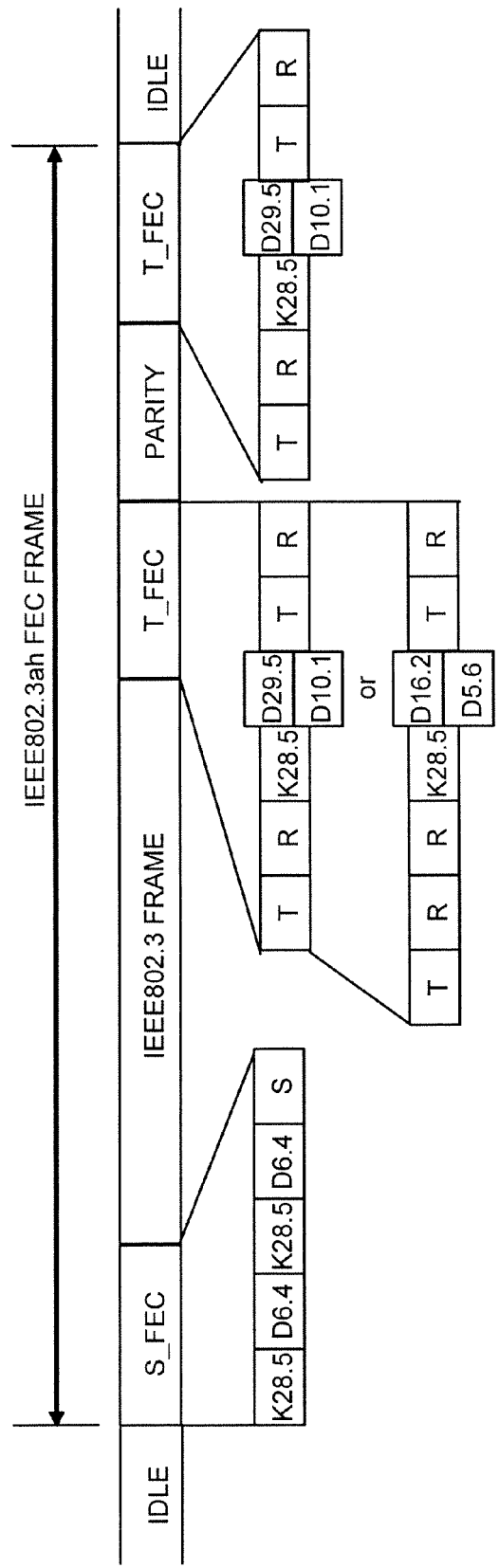

FIG. 1 is a diagram of a structure of a T_FEC-between-frame-and-parity detecting unit 1 according to a first embodiment of the communication apparatus according to the present invention. The T_FEC-between-frame-and-parity detecting unit 1 includes T_FEC-pattern detecting units 11 and 12, a T_FEC-code-distance comparing unit 14, a T_FEC-boundary-signal generating unit 15, and delay elements 16 and 17.

The T_FEC-pattern detecting units 11 and 12 shown in FIG. 1 compare an FEC frame, which is inputted to the T_FEC-between-frame-and-parity detecting unit 1, and a T_FEC pattern. The input FEC frame is delayed by the delay element 16 and the delayed FEC frame is inputted to the T_FEC-pattern detecting unit 12.

The T_FEC-pattern detecting units 11 and 12 output respective code distances, which is obtained as a result of comparison of the input FEC frame and the T_FEC pattern, to the T_FEC-code-distance comparing unit 14 one after another. The T_FEC-code-distance comparing unit 14 compares the code distances received respectively from the T_FEC-pattern detecting units 11 and 12. For example, when the code distance received from the T_FEC-pattern detecting unit 12 is small and equal to or smaller than an allowable number of errors (in IEEE802.3ah, equal to or smaller than 4 bits) of a T_FEC, the T_FEC-code-distance comparing unit 14 notifies the T_FEC-boundary-signal generating unit 15 that a pattern detected by the T_FEC-pattern detecting unit 12 is a T_FEC.

The T_FEC-boundary-signal generating unit 15 generates and outputs a T_FEC boundary signal based on the information notified from the T_FEC-code-distance comparing unit 14. Specifically, the T_FEC boundary signal indicates a position (a boundary) of a T_FEC corresponding to the FEC frame that has passed the delay element 17.

Figures 2, 8:
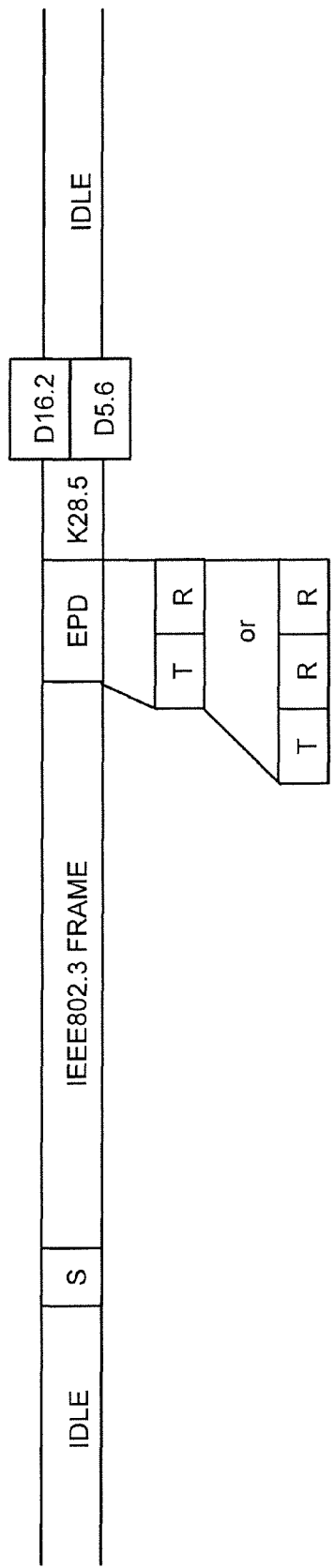

Operations of the communication apparatus are explained below. FIGS. 2-1 to 2-3 are diagrams for explaining a T_FEC-between-frame-and-parity detecting method according to the first embodiment. Specifically, states in which code patterns of a frame inputted to a receiving unit are inputted to the T_FEC-pattern detecting units 11 and 12 in order are shown in time series in FIGS. 2-1 to 2-3. 11a and 12a in FIGS. 2-1 to 2-3 indicate detection windows employed in the T_FEC-pattern detecting unit 11 and the T_FEC-pattern detecting unit 12, respectively. These detection windows partially overlap each other.

A state in which 4 bytes at a frame end and 2 bytes at a T_FEC front are in the detection window 11a of the T_FEC-pattern detecting unit 11 is shown in FIG. 2-1. The 4 bytes at the frame end is a pattern that coincides with 4 bytes at a T_FEC front (/T/R/K28.5/D29.5/) within a code distance of 4 bits. 4 bytes at a parity front is a pattern that coincides with 4 bytes at a T_FEC end (/K28.5/D29.5/T/R/) within a code distance 4 bits. It is assumed that the original T_FEC has no error. In the example shown in FIG. 2-1, in the T_FEC detection window 11a, the T_FEC-code-distance comparing unit 14 detects the pattern to a T_FEC pattern. However, the code pattern in the T_FEC detection window 12a is a normal data code and the code distance between the code pattern and the T_FEC pattern is always equal to or larger than 5 bits. Therefore, in the T_FEC detection window 12a, the T_FEC-code-distance comparing unit 14 judges that the code pattern is not a T_FEC and performs nothing.

A state in which the pattern that was in the T_FEC detection window 11a in FIG. 2-1 has now entered into the T_FEC detection window 12a and the T_FEC has entered into the T_FEC detection window 11a is shown in FIG. 2-2. In the example shown in FIG. 2-2, when the pattern in the T_FEC detection window 12a has a code distance smaller than or equal to that of a pattern in the T_FEC detection window 11a and is equal to or smaller than an allowable number of errors of the T_FEC, the T_FEC-code-distance comparing unit 14 judges that a pattern detected by the T_FEC-pattern detecting unit 12 is a T_FEC and notifies detection of T_FEC to the T_FEC-boundary-signal generating unit 15. On the other hand, when the pattern in the T_FEC detection window 11a has a code distance smaller than that of the pattern in the T_FEC detection window 12a, the T_FEC-code-distance comparing unit 14 performs nothing as in the case shown in FIG. 2-1. In the example shown in FIG. 2-2, the pattern in the T_FEC detection window 11a obviously has a smaller code distance, so that, in this case either, the T_FEC-code-distance comparing unit 14 does not notify the T_FEC-boundary-signal generating unit 15 of the detection of a T_FEC.

A state in which the T_FEC that was in the T_FEC detection window 11a in FIG. 2-2 has now entered into the T_FEC detection window 12a and the 4 bytes at the parity front enter has entered into the T_FEC detection window 11a is shown in FIG. 2-3. In the example shown in FIG. 2-3, the pattern in the T_FEC detection window 12a has a smaller code distance than the pattern including the 4 bytes at the front of the parity in the T_FEC detection window 11a. Therefore, the T_FEC-code-distance comparing unit 14 notifies detection of the T_FEC to the T_FEC-boundary-signal generating unit 15.

As explained above, in this embodiment, two different but overlapping detection windows are employed and, a position of the T_FEC is judged after checking a T_FEC in an FEC frame and the patterns in front and behind the T_FEC. As a result, misdetection of the T_FEC will not occur if no error is included in the original T_FEC. Even if an error is included in the T_FEC of the FEC frame, misdetection of the T_FEC can occur only in a rare situation. That is, for example, when the code distance of a pattern obtained by combining 4 bytes at the frame end and 2 bytes at the T_FEC front and a code distance of the T_FEC pattern are equal and an error of the code distance of 4 bits occurs in the 4 bytes at the T_FEC end. In other words, misdetection of the T_FEC can occur only when the pattern obtained by combining the 4 bytes at the frame end and the 2 bytes at the T_FEC front and the T_FEC pattern coincide with each other at a code distance of 4 bits.

The above embodiment is explained by taking a T_FEC of 6 bytes (/T/R/K28.5/D29.5/T/R/) as an example; however, the same effect can be obtained even if the T_FEC is 6 bytes (/T/R/K28.5/D10.1/T/R/) or 7 bytes (/T/R/R/K28.5/D16.2(or /D5.6/)/T/R/).

Second Embodiment.

In the above embodiment, two T_FEC detection windows have been used. It is possible, however, to further reduce the probability of misdetection of a T_FEC by increasing the number of T_FEC detection windows to three. Processing different from that in the first embodiment described above is explained below.

FIG. 3 is a diagram of a structure of a T_FEC-between-frame-and-parity detecting unit 1 according to a second embodiment of the communication apparatus according to the present invention. When compared with the structure according to the first embodiment, a T_FEC-pattern detecting unit 13 and a delay element 18 are newly added and the T_FEC-code-distance comparing unit 14 is replaced with a T_FEC-code-distance comparing unit 19. The T_FEC-code-distance comparing unit 19 uses different judgment conditions than those used in the T_FEC-code-distance comparing unit 14.

Operations of the communication apparatus are explained below. FIG. 4 is a diagram for explaining a T_FEC-between-frame-and-parity detecting method according to the second embodiment. 11a, 12a, and 13a in FIG. 4 correspond to detection windows employed by the T_FEC-pattern detecting units 11, 12, and 13, respectively. Each of the detection windows partially overlaps with the adjacent detection window. Operations of the T_FEC-code-distance comparing unit 19 different from the processing according to the first embodiment are explained below.

(I) For example, when the code distance is equal to or smaller than the allowable number (in IEEE802.3ah, equal to or smaller than 4 bits) in only the T_FEC detection window 11a, the T_FEC-code-distance comparing unit 19 does not notify detection of a T_FEC to the T_FEC-boundary-signal generating unit 15.

(II) When the code distance is equal to or smaller than the allowable number (in IEEE802.3ah, equal to or smaller than 4 bits) in only the T_FEC detection window 12a, the T_FEC-code-distance comparing unit 19 does not notify detection of a T_FEC to the T_FEC-boundary-signal generating unit 15.

(III) When the code distance is equal to or smaller than the allowable number (in IEEE802.3ah, equal to or smaller than 4 bits) in only the T_FEC detection window 13a, the T_FEC-code-distance comparing unit 19 judges that a pattern detected in the T_FEC detection window 13a is a T_FEC and notifies detection of the T_FEC to the T_FEC-boundary-signal generating unit 15.

(IV) When the code distances are equal to or smaller than the allowable number (in IEEE802.3ah, equal to or smaller than 4 bits) in both the T_FEC detection windows 11a and 12a, the T_FEC-code-distance comparing unit 19 does not notifies detection of a T_FEC to the T_FEC-boundary-signal generating unit 15.

(V) When the code distances are equal to or smaller than the allowable number (in IEEE802.3ah, equal to or smaller than 4 bits) in both the T_FEC detection windows 13a and 12a, the T_FEC-code-distance comparing unit 19 compares the code distance inputted from the T_FEC-pattern detecting unit 12 and the code distance inputted from the T_FEC-pattern detecting unit 13. When the code distance inputted from the T_FEC-pattern detecting unit 13 is smaller, the T_FEC-code-distance comparing unit 19 judges that a pattern detected in the T_FEC detection window 13a is a T_FEC and notifies detection of the T_FEC to the T_FEC-boundary-signal generating unit 15.

(VI) When the code distances are equal to or smaller than the allowable number (in IEEE802.3ah, equal to or smaller than 4 bits) in both the T_FEC detection windows 11a and 13a, the T_FEC-code-distance comparing unit 19 judges that a pattern detected in the T_FEC detection window 12a is a T_FEC and notifies detection of the T_FEC to the T_FEC-boundary-signal generating unit 15.

(VII) When the code distances are equal to or smaller than the allowable number (in IEEE802.3ah, equal to or smaller than 4 bits) in all the three T_FEC detection windows 11a, 12a, and 13a, the T_FEC-code-distance comparing unit 19 judges that a pattern detected in the T_FEC detection window 12a is a T_FEC and notifies detection of the T_FEC to the T_FEC-boundary-signal generating unit 15.

As explained above, in this embodiment, three different but overlapping detection windows are employed and, a position of the T_FEC is judged after checking a T_FEC in an FEC frame and the patterns in front and behind the T_FEC. Thus, it is possible to prevent misdetection in the cases of, for example, (VI) and (VII) above in which it is impossible to prevent misdetection of a T_FEC in the first embodiment.

Third Embodiment.

In the above embodiments, the probability of misdetection of a T_FEC is reduced by using a plurality of T_FEC detection windows. However, in this embodiment, misdetection of a T_FEC is prevented by using the relation between the frame length and the parity length.

FIG. 5 is a diagram of a structure of a frame-boundary detecting unit 2 according to a third embodiment of the communication apparatus according to the present invention. The frame-boundary detecting unit 2 includes an S_FEC-pattern detecting unit 21, a T_FEC-pattern detecting unit 22, parity-length checking units 23-1 to 23-n, a frame-boundary-signal generating unit 24, and a delay element 25. In this embodiment, not only a boundary signal of a T_FEC, which is located between a frame and a parity, but also a boundary signal between the frame and the parity are collectively generated.

The frame-boundary detecting unit 2 shown in FIG. 5 detects an S_FEC and a T_FEC in the inputted FEC frame and generates a boundary signal between a frame and a parity. Specifically, the inputted FEC frame is inputted to each of the S_FEC-pattern detecting unit 21, the T_FEC-pattern detecting unit 22, the parity-length checking units 23-1 to 23-n, and the delay element 25. The delay element 25 is an element for synchronizing an FEC frame, which is output, and an FEC frame boundary signal generated by the frame-boundary-signal generating unit 24.

The S_FEC-pattern detecting unit 21 performs detection of coincidence of the FEC frame with an S_FEC pattern and, when a pattern having a code distance to the FEC frame equal to or smaller than the allowable number of errors (in IEEE8023ah, equal to or smaller than 4 bits) is detected, notifies detection of S_FEC to the frame-boundary-signal generating unit 24.

The T_FEC-pattern detecting unit 22 performs detection of coincidence of the FEC frame with a T_FEC pattern and, when a pattern having a code distance to the FEC frame equal to or smaller than the allowable number of errors (in IEEE802.3ah, equal to or smaller than 4 bits) is detected, notifies detection of T_FEC to the frame-boundary-signal generating unit 24.

The frame-boundary-signal generating unit 24 counts a frame length of an IEEE802.3 frame (a frame) from a S_FEC detection signal output from the S_FEC-pattern detecting unit 21 and a T_FEC detection signal output from the T_FEC-pattern detecting unit 22, and outputs the result of the counting, i.e., the frame length, to each of the parity-length checking units 23-1 to 23-n. Because it is possible that n (n is a natural number) T_FECs are detected in one FEC frame, the frame-boundary-signal generating unit 24 counts frame lengths of each of the n T_FECs and outputs result of the counting to a corresponding one of the n parity-length checking units 23-1 to 23-n in order.

Each of the parity-length checking units 23-1 to 23-n calculates a parity length by using Equation (1) below based on the frame length inputted from the frame-boundary-signal generating unit 24. Each of the parity-length checking units 23-1 to 23-n checks whether a pattern having a code distance equal to or smaller than the allowable number of errors (in IEEE802.3ah, equal to or smaller than 4 bits) is present behind the parity. For example, when a unit from among the parity-length checking units 23-1 to 23-n detects such a pattern, that unit notifies the frame-boundary-signal generating unit 24 "yes" and, when such a pattern is not detected, notify the frame-boundary-signal generating unit 24 "no".

$$\text{(Parity length)}=[(\text{frame length})]/239]\times16(\text{unit:byte}) \quad (1)$$

The fractions in the square brackets in Equation 1 are rounded up.

The frame-boundary-signal generating unit 24 judges that the frame lengths that are outputted by the parity-length checking units from which "yes" is received, i.e., positions of the S_FEC and the T_FEC between the frame and the parity, are correct and outputs an FEC frame boundary signal to a circuit at a post stage.

Operations of the communication apparatus are explained below. FIGS. 6-1 and 6-2 are diagrams for explaining a T_FEC-between-frame-and-parity detecting method according to the third embodiment. Specifically, in FIG. 6-1, a T_FEC between a frame and a parity is detected normally, i.e., a signal indicating "yes" is returned from one of the parity-length checking units to the frame-boundary-signal generating unit 24. In FIG. 6-2, a T_FEC between a frame and a parity is not detected normally, i.e., a signal indicating "no" is returned from one of the parity-length checking units to the frame-boundary-signal generating unit 24.

For example, in FIG. 6-1, when the S_FEC-pattern detecting unit 21 detects an S_FEC and the detection of the S_FEC is notified to the frame-boundary-signal generating unit 24, the frame-boundary-signal generating unit 24 starts counting of a frame length. When the detection of the T_FEC is notified from the T_FEC-pattern detecting unit 22, the frame-boundary-signal generating unit 24 stops the counting of the frame length and outputs a result of the counting of the frame length to, for example, the parity-length checking unit 23-1. Because the parity-length checking unit 23-1 performs checking of a parity length based on the result of the counting of a frame length from the frame-boundary-signal generating unit 24 by using Equation (1), and, based on such a checking detects a T_FEC behind the parity, the parity-length checking unit 23-1 notifies the frame-boundary-signal generating unit 24 "yes".

On the other hand, in FIG. 6-2, when the S_FEC-pattern detecting unit 21 detects an S_FEC and the detection of the S_FEC is notified to the frame-boundary-signal generating unit 24, the frame-boundary-signal generating unit 24 starts counting of a frame length. When the detection of the T_FEC is notified from the T_FEC-pattern detecting unit 22, the frame-boundary-signal generating unit 24 stops the counting of a frame length, and outputs a result of the counting of a frame length to, for example, the parity-length checking unit 23-2. Because the T_FEC-pattern detecting unit 22 has detected a wrong pattern as a T_FEC, the result of the counting of the frame length is shorter than the same at the normal time. Therefore, the parity-length checking unit 23-2 performs check of a parity length based on the result of the counting of the frame length from the frame-boundary-signal generating unit 24. However, because a T_FEC is not detected behind the parity, the parity-length checking unit 23-2 notifies the frame-boundary-signal generating unit 24 "no".

Actually, when misdetection occurs of a T_FEC, which is located between a frame and a parity, it means that a plurality of T_FECs are detected in one FEC frame. Therefore, when misdetection of a T_FEC occurs, the processing in FIG. 6-1 and the processing in FIG. 6-2 are performed in parallel.

As described above, in this embodiment, the relation between a frame length and a parity length is checked to judge a position of a T_FEC. Thus, even when a T_FEC that should be correct has a specified code distance to a T_FEC pattern larger than that of a false T_FEC, which cannot be prevented in the first and the second embodiments, it is possible to prevent misdetection of the T_FEC. This makes it possible to reduce the probability of misdetection of a T_FEC more than the first and the second embodiments.

Fourth Embodiment.

In the above embodiments, the processing for deciding a position of a T_FEC is explained. However, in this embodiment, FEC decoding processing is applied to all possible candidates of a T_FEC and a candidate having a smallest number of error corrections during the FEC decoding is outputted to a circuit at a post stage. This configuration makes it possible to further reduce the probability of misdetection of a T_FEC.

FIG. 7 is a diagram of a structure according to a fourth embodiment of the communication apparatus according to the present invention. The communication apparatus includes an FEC-frame-boundary detecting unit 3, a 10B/8B converting unit 4, FEC decoding units 5-1 to 5-3, an FEC-error-correction-number comparing unit 6, and a selector 7.

The FEC-frame-boundary detecting unit 3 shown in FIG. 7 detects an S_FEC and a T_FEC from the inputted FEC frame and generates all possible FEC frame boundary signals. As processing for detecting a T_FEC by the FED-frame-boundary detecting unit 3, for example, the T_FEC detection processing described in the first and the second embodiment can be employed.

Misdetection of a T_FEC between a frame and a parity is often performed in 4 bytes (or 5 bytes) at the end of the frame and 2 bytes at the front of the T_FEC or performed in 2 bytes at the end of the T_FEC and 4 bytes (or 5 bytes) of the parity. A probability of detection of the T_FEC in the middle of the frame is not zero. However, in that case, because the frame has a pattern closer to the T_FEC from the beginning and an error needs to be added in a direction in which a code distance to the T_FEC is smaller on a transmission channel, the probability of occurrence is extremely small.

Consequently, in this embodiment, maximum three kinds of FEC frame boundary signals are outputted from the FEC-frame-boundary detecting unit 3 to the FEC decoding units 5-1 to 5-3, respectively. However, the number of FEC decoding units can be increased to cope with four or more FEC frame boundary signals.

The FEC-frame-boundary detecting unit 3 delays the inputted FEC frame by a certain time so that the inputted frame is synchronized with FEC frame boundary signals #1 to #3 and outputs the FEC frame.

The 10B/8B converting unit 4 converts the FEC frame inputted with a 10B code into a 8B code and outputs the result of the conversion to the FEC decoding units 5-1 to 5-3.

The FEC decoding units 5-1 to 5-3 separate the frame and the parity based on the FEC frame boundary signals, respectively, and outputs the numbers of error corrections obtained by this processing to the FEC-error-correction-number comparing unit 6.

The FEC-error-correction-number comparing unit 6 compares the numbers of error corrections outputted from the respective FEC decoding units and switches the selector 7 to output an output of the FEC decoding unit having the smallest number of error corrections to a circuit at a post stage.

As explained above, in this embodiment, the EC decoding processing is executed based on all the possible FEC frame boundary signals, and the result of the FEC decoding processing with the smallest number of error corrections is outputted to the circuit at the post stage. As a result, the possibility of misdetection of the T_FEC is eliminated by the use of the combination of the 4 bytes (or 5 bytes) at the end of the frame and the 2 bytes at the front of the T_FEC and the combination of the 2 bytes at the end of the T_FEC and the 4 bytes (or 5 bytes) at the front of the parity. In other words, it is possible to reduce the probability of misdetection of the T_FEC to a practically acceptable degree.

INDUSTRIAL APPLICABILITY

As explained above, the communication apparatus according to the present invention is useful for an optical network of the GE-PON system and, in particular, suitable as a communication apparatus in realizing an FEC function according to the standard of IEEE802.3ah.

The invention claimed is:

1. A communication apparatus that realizes an FEC (forward error correction) function, the communication apparatus comprising:

a T_FEC-pattern comparing unit that executes, for each of a plurality of detection windows provided at staggered times, processing for comparing an input FEC frame, which is defined in IEEE802.3ah, and a pre-defined T_FEC pattern, which is a pattern for boundary identification added in the input FEC frame at the time of transmission, thereby calculating each code distance between a pattern of the input FEC frame falling in a corresponding one of the detection windows and the same pre-defined T_FEC pattern for each of the detection windows one after another;

a code-distance comparing unit that compares at least one of the calculated code distances corresponding to a first one of the detection windows to another one of the calculated code distances corresponding to a second one of the detection windows at a different time from the first one of the detection windows, and detects, based on a result of the comparison, a code for boundary identification T_FEC between an IEEE802.3 frame and an FEC parity; and a boundary-signal generating unit that generates, based on a result of the detection, a T_FEC boundary signal as a signal indicating a detection position of the T_FEC in the FEC frame.

2. The communication apparatus according to claim 1, wherein a certain detection window partially overlaps with at least one adjacent detection window.

3. The communication apparatus according to claim 2, wherein the detection windows are two in number.

4. The communication apparatus according to claim 2, wherein the detection windows are three in number.

5. The communication apparatus according to claim 1, wherein the plurality of detection windows are staggered from each other by two symbol time periods.

6. The communication apparatus according to claim 1, wherein the code-distance comparing unit compares the at least one of the calculated code distances corresponding to a first one of the detection windows, which is a detection window in front of the T_FEC, to the second one of the detection windows, which is a detection window behind the T_FEC.

* * * * *